US010823588B2

(12) United States Patent
Bouscaren

(10) Patent No.: US 10,823,588 B2
(45) Date of Patent: Nov. 3, 2020

(54) METHOD FOR AUTOMATIC CALIBRATION OF A CAMSHAFT SENSOR FOR A MOTOR VEHICLE ENGINE

(71) Applicants: Continental Automotive France, Toulouse (FR); Continental Automotive GmbH, Hannover (DE)

(72) Inventor: Denis Bouscaren, Paris (FR)

(73) Assignees: Continental Automotive France, Toulouse (FR); Continental Automotive GmbH, Hannover (DE)

( * ) Notice: Subject to any disclaimer, the term of this patent is extended or adjusted under 35 U.S.C. 154(b) by 0 days.

(21) Appl. No.: 16/633,666

(22) PCT Filed: Jul. 17, 2018

(86) PCT No.: PCT/FR2018/051814
§ 371 (c)(1),
(2) Date: Jan. 24, 2020

(87) PCT Pub. No.: WO2019/020905
PCT Pub. Date: Jan. 31, 2019

(65) Prior Publication Data
US 2020/0182663 A1 Jun. 11, 2020

(30) Foreign Application Priority Data

Jul. 25, 2017 (FR) ..................................... 17 57048

(51) Int. Cl.
*G01D 18/00* (2006.01)
*G01D 5/14* (2006.01)
(52) U.S. Cl.
CPC ............... *G01D 18/00* (2013.01); *G01D 5/14* (2013.01)

(58) Field of Classification Search
CPC ........ G01D 18/00; G01D 5/14; G01D 5/2448; G01D 5/145; G01D 18/004
See application file for complete search history.

(56) References Cited

U.S. PATENT DOCUMENTS 5,917,320 A * 6/1999 Scheller ................... G01D 3/02
324/166
9,389,098 B2 * 7/2016 Hammerschmidt . G01R 33/098
(Continued)

FOREIGN PATENT DOCUMENTS

| FR | 2985035 A1 | 6/2013 |
| FR | 3041426 A1 | 3/2017 |
| FR | 3044087 A1 | 5/2017 |

OTHER PUBLICATIONS

International Search Report and Written Opinion for International Application No. PCT/FR2018/051814, dated Nov. 6, 2018, 7 pages.
(Continued)

*Primary Examiner* — Jay Patidar
(74) *Attorney, Agent, or Firm* — RatnerPrestia

(57) ABSTRACT

A method for automatic calibration of an engine camshaft sensor, the engine including at least one camshaft, a coded toothed target associated with this camshaft and a magnetic field sensor placed in the vicinity of the target to detect magnetic field variations induced by passage of the target's teeth in the vicinity of the sensor, the sensor delivering an electrical signal representative of teeth and gaps of the target depending on a predetermined switching threshold as a function of the magnetic field's amplitude, the method continuously measuring the value of the magnetic field. The method calculating switching thresholds of the leading edges of the teeth over a new turn of the target to improve the precision of detection of the leading edges of the teeth.

4 Claims, 3 Drawing Sheets

(56) References Cited

U.S. PATENT DOCUMENTS

| 10,267,657 | B2 | 4/2019 | Mirassou et al. |
| 2009/0001965 | A1* | 1/2009 | Ausserlechner ........ G01P 21/02 |
| | | | 324/202 |
| 2014/0195186 | A1 | 7/2014 | Carbonne et al. |
| 2015/0061647 | A1* | 3/2015 | Bleicher .............. G01N 27/725 |
| | | | 324/202 |
| 2018/0356256 | A1 | 12/2018 | Mirassou et al. |

OTHER PUBLICATIONS

English Translation of the Written Opinion for International Application No. PCT/FR2018/051814, dated Nov. 6, 2018, 5 pages.

* cited by examiner

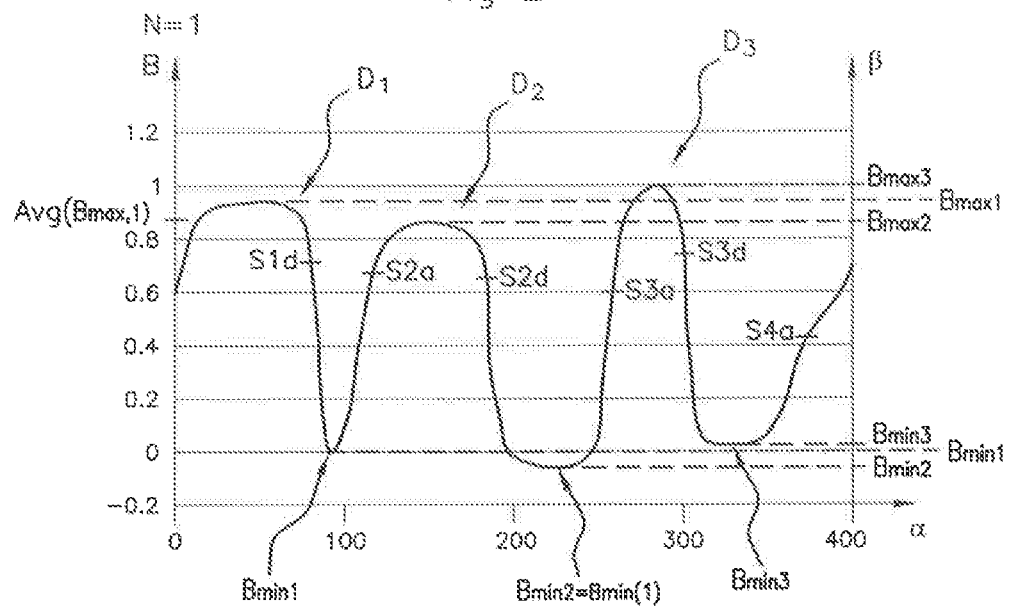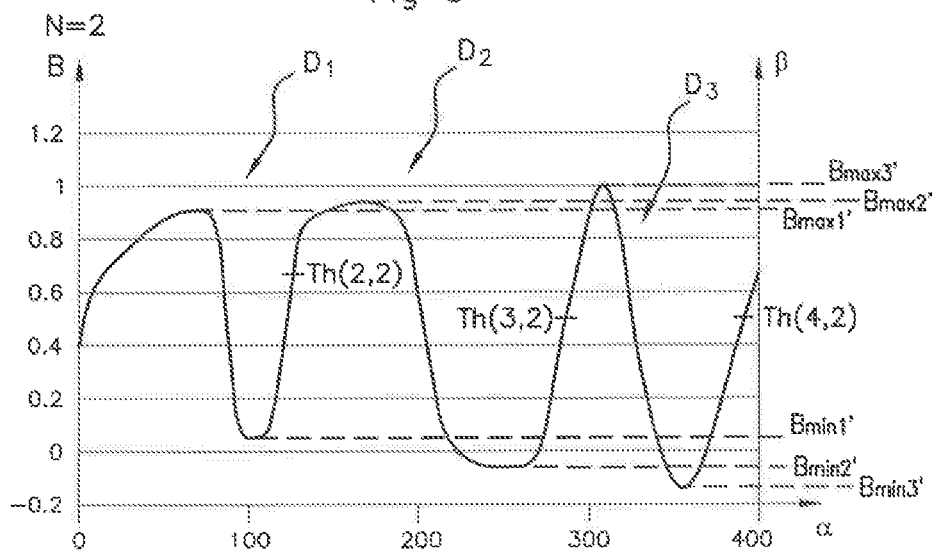

METHOD FOR AUTOMATIC CALIBRATION OF A CAMSHAFT SENSOR FOR A MOTOR VEHICLE ENGINE

CROSS REFERENCE TO RELATED APPLICATIONS

This application is the U.S. National Phase Application of PCT International Application No. PCT/FR2018/051814, filed Jul. 17, 2018, which claims priority to French Application No. FR 1757048, filed Jul. 25, 2017, the contents of such applications being incorporated by reference herein.

FIELD OF THE INVENTION

The present invention relates to a method for automatically calibrating a motor vehicle camshaft sensor. More particularly, it is a matter of determining automatically the "out-of-roundness" of a toothed wheel (also referred to as target) mounted on the end of a motor vehicle engine camshaft.

BACKGROUND OF THE INVENTION

Camshaft sensors are used in a motor vehicle to determine the position of the various cylinders in the engine combustion cycle, namely to determine whether each cylinder is in the admission phase, the compression phase, the combustion phase or the exhaust phase. These sensors generally comprise a magnetic field generator (for example: a permanent magnet), a means of detecting the magnetic field (Hall-effect cell, magnetoresistive MR cell, giant magnetoresistive GMR cell, etc. for example) and an electronic circuit for processing the signal received by the means of detecting the magnetic field. These sensors, which are referred to as active sensors, deliver a digital signal to a central processor for processing.

The magnetic field generator may also be the target, made of a magnetic material, exhibiting an alternation of south poles and north poles. In that case, the sensor may or may not incorporate a permanent magnet, depending on the means of detection used. Hereinafter, the south and north poles will be likened to the teeth and troughs of a mechanical target.

In a known manner, a camshaft sensor is associated with a target attached to a camshaft. This target takes the form of a disk, the periphery of which is toothed. These teeth have the same height but different spacings (troughs) and lengths, so as to perform encoding (known per se) of the positioning of the cylinders in the combustion engine combustion cycle for a motor vehicle.

The means of detecting the magnetic field, which is present in the sensor, detects the passage of the teeth of the target in front of it and the resulting signal makes it possible to determine the position of each cylinder with respect to the engine combustion cycle, in a way known per se.

In order to determine the position of each cylinder in the engine cycle, the curve of the variations in the magnetic field perceived by the camshaft sensor during a revolution of the target is observed. This curve exhibits a series of humps, each corresponding to one tooth of the target. By measuring the spacing between each of the humps and the duration of each, it is possible to determine the position of each cylinder with respect to the engine combustion cycle. To this end, it is therefore important to guarantee the accuracy of the position of the electrical wave edges of the signal generated by the sensor with respect to the position of the mechanical faces of the target, each of its electrical wave edges being representative of the passage of the mechanical faces of a tooth. The objective is to reduce to a minimum the phase shift in the signal caused by the fact that the sensor and the target are variably separated from one another. The electrical signal generated by the sensor changes state (high or low) when the magnetic signal crosses a predetermined switching threshold proportional to its amplitude. In order to do this, this switching threshold is set (at 75% of the amplitude, which corresponds to an optimum with regard to the accuracy between the electrical wave edges/mechanical faces for most existing targets) in order to determine the instant at which each wave edge defining a tooth passes. Thus, as soon as a first maximum and a first minimum of the perceived magnetic field are detected, the switching threshold value that corresponds to 75% of this amplitude is determined, and it is considered that a falling edge is detected if the measured value of the magnetic field drops below this threshold value; and, conversely, a rising front is detected if the measured value of the magnetic field rises above this switching threshold value (or vice versa).

By proceeding in this manner, the moment of detection of the edge is optimized. However, this method presupposes that all the teeth have the same height and that there is no defect in geometry (sensors and target). Now, the sensors have the disadvantage of being sensitive to the positioning of the target on the camshaft and to the geometry of this target.

For cost reasons, the targets, which are simple metal parts provided with teeth of predetermined dimensions and spacing, are mass-produced and often exhibit imperfect geometry. In particular, the teeth do not always have the same height in relation to the center of the target. This defect is what is referred to as "out-of-roundness". The consequence of this is that the top part of each tooth of the target is not placed on the same circle centered on the camshaft. Hence the term "out-of-roundness" used to describe this problem. This out-of-roundness in the manufacture of the target may be compounded by an out-of-roundness of the mounting of the target on the camshaft. There are also air gap defects between the sensor and the target, these defects varying with time and being sensitive to temperature.

Obviously, since the camshaft sensor measures variations in the magnetic field created by the passage of the teeth in front of it, if one tooth is lower (or higher) than the others, the separation between this tooth and the sensor varies with respect to the other teeth and causes a variation of the detected magnetic field. These magnetic field variations can degrade the measurements performed (degrade the accuracy of the position of the electrical wave edges relative to the mechanical faces), or may even fail to be interpreted by the sensor (non-detection of a tooth, the magnetic field being below the switching threshold). The signal delivered by the camshaft sensor is then erroneous and correct determination of the position of each cylinder in the engine cycle is corrupted or even impossible.

In order to mitigate these phenomena of "out-of-roundness" and/or of "airgap defect", it is known practice in the prior art to calibrate the magnetic field detection means to take account of this "out-of-roundness" and/or of this "airgap defect" and thus deliver a corrected measurement (better electrical wave edge mechanical face accuracy and elimination of the risk of non-detection of a tooth) to the central processor tasked with determining the position of each cylinder in the engine cycle.

Such a prior art method is described in the application whose publication number is FR 3 041426 A1, filed by the applicant, and incorporated by reference herein.

The aim of said method for automatically calibrating a motor vehicle engine camshaft sensor is to reduce the fluctuations on the signal at the output of the sensor. To this end, the method proposes comparing, on each new target revolution, the new maximum values of the magnetic field of each tooth to the maximum values of said same teeth from the preceding target revolution. The switching thresholds are calculated using the new maximum values only if they differ (according to a predefined criterion) from the maximum values of the preceding target revolution. In addition, the prior art proposes using a single minimum value of the magnetic field, that is to say the absolute minimum value over a target revolution, in order to calculate the switching thresholds.

However, this prior art method does not make it possible to achieve the accuracy required by certain motor vehicle constructors on the position of the camshaft.

SUMMARY OF THE INVENTION

An aspect of the present invention proposes a method for automatically calibrating a camshaft which makes it possible to mitigate this drawback. In this particular instance, the calibration method according to an aspect of the invention makes it possible to deliver a signal at the output of the camshaft sensor that is more accurate than that of the prior art, and yet which makes it possible to determine and correct the "out-of-roundness" of a target and the "airgap defect" between the sensor and the target.

An aspect of the invention proposes a method for automatically calibrating a motor vehicle engine camshaft sensor, said engine comprising at least one camshaft, a toothed coded target associated with this camshaft and a magnetic field sensor placed in proximity to the target to detect the magnetic field variations induced by the passage of the teeth of the target in proximity to the sensor, said sensor delivering an electrical signal representative of teeth and troughs of the target as a function of a predetermined switching threshold that is a function of the amplitude of the magnetic field, said method consisting in continuously measuring the value of the magnetic field, said method comprising the following steps:

during a first target revolution:
  Step E1: measuring a maximum value and a minimum value of the magnetic field for each tooth,
  Step E2: calculating an amplitude of the magnetic field for said teeth, and calculating the switching threshold for each tooth rising edge as a function of the duly calculated amplitude, an aspect of the invention being noteworthy in that the method further comprises the following steps:
  Step E3: measuring an absolute minimum value of the magnetic field over the target revolution,
  Step E4: calculating an average of the maximum values of the magnetic field over the target revolution,
  Step E5: memorizing the maximum values, the absolute minimum value, and the average of the maximum values,
  Step E6: if a minimum value of a tooth of the new revolution B min(i–1, N) is greater than the absolute minimum value of the preceding revolution B min(N–1), then the switching threshold of the rising edge of the next tooth Th (i, N) is equal to:
  Step E7:

$$Th(i,N)=(B\ max(i-1,N)-B\ min(i-1,N))\times K-B\ min(i-1,N)$$

with:
  B max(i–1, N): maximum value of the field on the tooth i–1 of the new target revolution,
  B min(i–1, N): minimum value of the field on the tooth i–1 of the new target revolution,
  K: factor lying between 0 and 1,
  otherwise: if a minimum value of a tooth over the new revolution B min(i–1, N) is equal to the absolute minimum value of the preceding revolution B min(N–1), and:
  Step E8: if, furthermore, the maximum value of the tooth is equal to the maximum value of the preceding revolution for the same tooth, namely if B max(i–1, N)=B max(i–1, N–1), then:
  Step E9: the maximum value of said tooth is removed from the average of the maximum values of the new revolution, namely $$Avg(B\ max,N)=Avg(B\ max,N-1)-B\ max(i-1,N)$$

with:
  Avg(B max, N): average of the minimum values of the magnetic field over the new revolution,
  Avg(B max, N–1): average of the minimum values of the magnetic field over the preceding revolution.
  Otherwise, if the maximum value of the magnetic field of the tooth is different from the maximum value of the preceding revolution for the same tooth, namely if $$B\ max(i-1,N)\neq B\ max(i-1,N-1), then:$$

Step E10: the average of the maximum values for the new revolution is equal to the average of the maximum values of the preceding revolution, namely Avg(B max, N)=Avg (B max,N–1)
  Step E11: the switching threshold Th(i,N) of the rising edge for the next tooth (i) is then calculated as a function of the average of the maximum values of the new revolution (N) and the minimum value of the preceding tooth B min(i–1, N)); namely equal to:

$$Th(i,N)=(Avg(B\ max,N)-B\ min(I-1,N))\times K-B\ min(I-1,N)$$

with: k: a factor lying between 0 and 1.
  repeating the steps E3 to E11 for each new target revolution in order to deliver a signal representative of the teeth and of troughs of the target.

According to an aspect of the invention, the first target revolution is performed each time the camshaft sensor (10) is powered up.

An aspect of the invention also applies to any motor vehicle engine camshaft sensor, said engine comprising at least one camshaft, a toothed coded target associated with this camshaft and a magnetic field sensor placed in proximity to the target to detect magnetic field variations induced by the passage of the teeth of the target in proximity to the sensor, said sensor continuously measuring the value of the magnetic field and delivering an electrical signal representative of teeth and troughs of the target as a function of a predetermined switching threshold that is a function of the amplitude of the magnetic field, said sensor comprising:
  means for measuring a maximum value and a minimum value of the magnetic field on each passage of a tooth,
  means for calculating the amplitude of the magnetic field for each tooth and for calculating the switching threshold, an aspect of the invention proposing that said sensor further comprise:

means for measuring an absolute minimum value over the target revolution, means for calculating an average of the maximum values over the target revolution, means for memorizing the maximum values, the average of the maximum values and the absolute minimum value over the target revolution, means for comparison between each minimum value of the new target revolution and the absolute minimum value of the preceding revolution, means for comparison between each maximum value of the magnetic field of the new target revolution and the maximum value of the preceding revolution for each tooth, means for calculating the average of the maximum values over the new target revolution as a function of the result of the comparison between each maximum value of the new target revolution and the maximum value of the preceding revolution for each tooth, means for calculating a switching threshold as a function of the result of the comparisons.

An aspect of the invention also relates to any motor vehicle comprising a camshaft sensor according to the features enumerated hereinabove.

BRIEF DESCRIPTION OF THE DRAWINGS

Other features and advantages of aspects of the present invention will become more apparent from reading the following description, provided by way of non-limiting example and with reference to the appended drawings, in which:

FIG. 2 illustrates an example of curves of the variation of the magnetic field perceived by a sensor associated with a target during the first revolution of the target, FIG. 3 illustrates an example of curves of the variation of the magnetic field perceived by a sensor associated with the target during a revolution following the first target revolution.

DETAILED DESCRIPTION OF THE PREFERRED EMBODIMENTS

Figure 1:
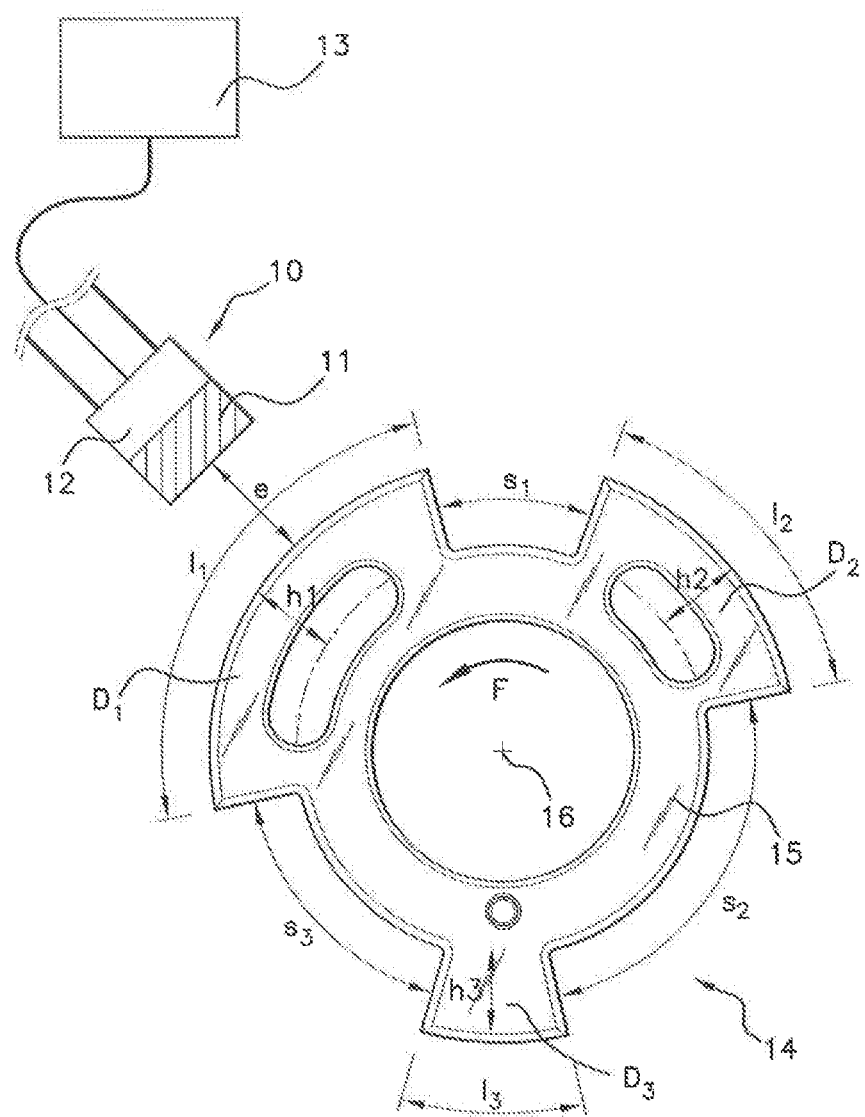
FIG. 1 is a schematic view in cross section, representing a camshaft sensor and its associated target.

According to the embodiment described and represented in FIGS. 1 to 3, a camshaft sensor 10 comprises a ferromagnetic element 11 and a magnetic field detection means 12 (for example a Hall-effect cell). This sensor 10 delivers a digital signal to a central processor 13.

A target 14 associated with this sensor 10 takes the form of a metal disk 15 securely fixed to a camshaft 16. This target bears, on its periphery, a plurality of teeth $D_1$, $D_2$, $D_3$ (3 in the example represented) of different heights h1, h2, h3 and of variable lengths $l_1$ to $l_3$ and variable spacings (troughs) $s_1$ to $s_3$. These variable lengths and spacings constitute, in a manner that is known per se, a coding.

The operation of such a sensor 10 plus target 14 assembly is described hereinafter.

When the target 14 is driven in rotation (arrow F FIG. 1) by the camshaft 16, the sensor 10 perceives a series of variations of the magnetic field B representative of the length l of the teeth $D_1$, $D_2$, $D_3$ passing in front of it and of their spacings $s_1$, $s_2$, $s_3$. The curve thus obtained, for example, during the first revolution of the target, is represented in FIG. 2.

In this FIG. 2, the x axis indicates the angles α of the engine cycle varying from 0° to 360° and the y axis indicates the value B of the perceived magnetic field (field normalized as a function of the air gap). As represented in FIG. 2, the teeth $D_1$, $D_2$, $D_3$ are not of the same height h1, h2, h3 and the target 14 exhibits a small geometry defect. Because of this, the maximum field perceived by the sensor 10 upon the passage of each of the teeth $D_1$, $D_2$, $D_3$ varies for each of the three teeth and respectively takes the values B max1, B max2, B max3. Likewise, the minimum field perceived by the sensor 10 upon the passage of each of the teeth $D_1$, $D_2$, $D_3$ varies tooth-by-tooth, and takes the respective values B min1, B min2, B min3. This FIG. 2 shows the passage of three teeth $D_1$, $D_2$, $D_3$, the first two ($D_1$, $D_2$) being relatively close together, the first tooth $D_1$ being wider than the second tooth $D_2$ and the passage of a third tooth $D_3$ that is narrower and further away from the second tooth $D_2$. This in fact corresponds to the geometry of the target 14 represented in FIG. 1.

It is known practice to detect the passage of a tooth edge as soon as the perceived magnetic field B rises above or drops below a predetermined switching threshold proportional to the amplitude of the field perceived during the passage of a tooth (75% of (B max1–B min1) for example).

The threshold values are embodied in FIG. 2 as dotted lines. After the passage of the first tooth $D_1$, a switching threshold for the rising edge of the second tooth S2a is calculated according to the following mathematical formula:

$$S2a = 0.75 \times (B \text{ max } 1 - B \text{ min } 1)$$

Then, after the passage of the maximum value of the magnetic field B on the passage of the second tooth B max2, a new switching threshold Std is calculated for the falling edge of the second tooth $D_2$:

$$S2d = 0.75 \times (B \text{ max } 2 - B \text{ min } 1)$$

This method is repeated on each passage of a tooth, when a new maximum value or a new minimum value of the magnetic field B has been measured.

It should be noted that the maximum value and the minimum value of the magnetic field B for each tooth correspond to the last recorded maximum and minimum values.

For example, calculating the switching threshold of the rising edge of the second tooth S2a, here entails considering the last recorded maximum and minimum values of the magnetic field B, that is to say B max1 and B min1, namely the maximum value and the minimum value of the magnetic field B after the passage of the first tooth $D_1$.

Similarly, in order to calculate the switching threshold for the falling edge of the second tooth S2d, use is made of the last recorded maximum and minimum values, in this case B min1 and B max2, namely the minimum value of the magnetic field B associated with the first tooth $D_1$ and the maximum value of the magnetic field associated with the second tooth $D_2$.

For the sake of simplification, the last measured maximum and/or minimum values, which are taken into consideration for calculating the switching threshold for said tooth, will be referred to here as the "maximum value (Bmaxi)" and/or "the minimum value (Bmini) which are associated with said tooth $D_1$". And "maximum value" is understood to mean the maximum value of the magnetic field and "minimum value" is understood to mean the minimum value of the magnetic field.

The target 14 associated with the camshaft 16 may, however, exhibit geometric imperfections which vary over time. In particular, the target 14 may have an "airgap" which increases over time, or with temperature. In that case, when the target 14 is driven in rotation during a revolution following the first revolution, the passage of its teeth $D_1$, $D_2$, $D_3$ in front of the sensor 10 provokes variations of the magnetic field B as represented in FIG. 3. In a way similar to FIG. 2 this curve indicates on the x axis the angles α of the engine cycle and, on the y axis, the normalized magnetic field B as a function of the airgap perceived by the sensor 10.

In this case, it will be noted that the new maximum value of the magnetic field B perceived for each of the teeth $D_1$, $D_2$, $D_3$, respectively, B max1', B max2', B max3' is not identical to the maximum value of the magnetic field perceived by each of those same teeth $D_1$, $D_2$, $D_3$ during the first revolution of the target 14 (cf. FIG. 2). Specifically, the first tooth $D_1$ is detected with a new maximum value B max1', the second tooth $D_2$ with a new maximum value B max2' and the third tooth $D_3$ with a new maximum value B max3'. The same applies for the minimum values of the magnetic field B perceived by the sensor 10 upon the passage of each tooth, $D_1$, $D_2$, $D_3$. The new minimum values of the magnetic field B for each of the teeth, $D_1$, $D_2$, $D_3$ respectively B min1', B min2', B min3', are not identical to the minimum values of the magnetic field B, which were measured during the first revolution of the target 14, for the same teeth (B min1, B min2, B min3).

In the case represented in FIGS. 2 and 3:

$B$ max 1'<$B$ max 1, $B$ min 1'>$B$ min 1, $B$ max 2'>$B$ max 2, $B$ min 2'<$B$ min 2, $B$ max 3'=$B$ max 3, $B$ min 3'<$B$ min 3.

An aspect of the invention therefore proposes a method for automatically calibrating a camshaft sensor, that makes it possible to take account of new maximum and minimum values of the magnetic field for each tooth $D_1$, $D_2$, $D_3$, in order to improve the accuracy of the sensor, while being simple to implement and less memory-intensive than the prior art.

An aspect of the invention described hereinbelow applies only to the switching thresholds applied to the rising edges of the teeth.

An aspect of the invention therefore ingeniously makes it possible to correct an "out-of-roundness" as soon as it appears.

Figure 4:
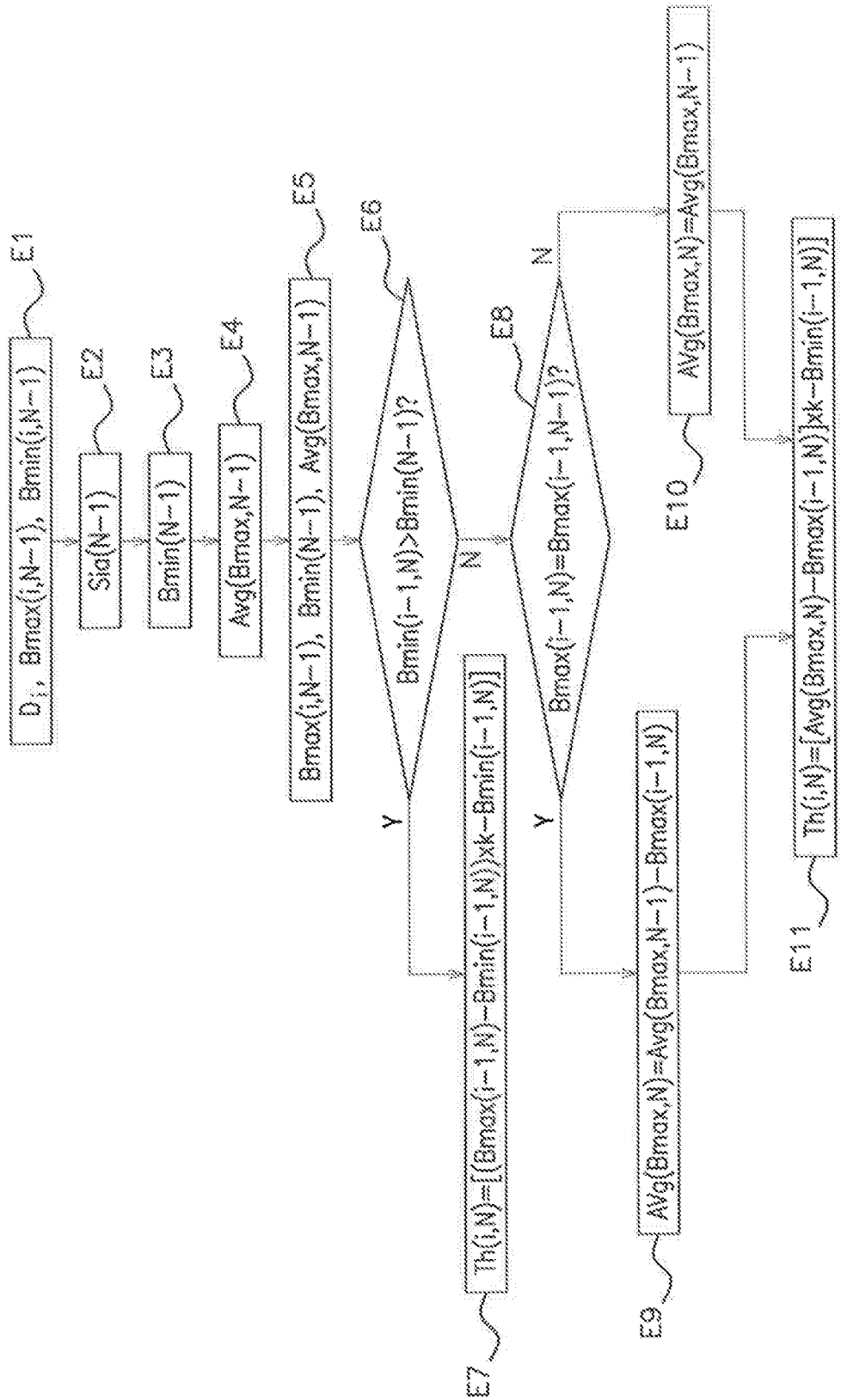
FIG. 4 illustrates the automatic calibration method according to an aspect of the invention.

An aspect of the invention proposes an automatic calibration method as described hereinbelow and illustrated in FIG. 4.

In a first target revolution preliminary to the powering-up, for example, of the camshaft sensor 10 there is a first step (step E1) of measurement of a maximum value B max1, B max2, B max3 and of a minimum value B min1, B min2, B min3 of the magnetic field B for each tooth $D_1$, $D_2$, $D_3$: And, in a second step (step E2): an amplitude of the magnetic field for said teeth is calculated, and a switching threshold S2a, S3a is applied for each tooth rising edge that is determined as a function of the duly calculated amplitude. This is known from the prior art.

The method according to an aspect of the invention is noteworthy in that it further comprises the following steps: In a third step (step E3), there is determined, from among the measured minimum values B min1, B min2, B min3, an absolute minimum value B min (N−1) of the magnetic field over the revolution (N−1) of the target 14 which has just been performed. An average Avg(B max, N−1) of the maximum values B max1, B max2, B max3 of the magnetic field over said target 14 revolution is also calculated (step E4). Finally, the maximum values B max1, B max2, B max3 associated with each tooth, the determined absolute minimum value B min(N−1) and the calculated average Avg(B max, N−1) are memorized (step E5).

An aspect of the invention then proposes that, on each new revolution of the target 14:

If a minimum value B min (i−1, N) of a tooth (i−1) over the new revolution N is greater than the absolute minimum value B min(N−1) of the preceding revolution (step E6), then:

the switching threshold Th(i, N) of the rising edge for the next tooth i of the new revolution N is equal to (step E7):

$Th(i,N)=(B\ \max(i-1,N)-B\ \min(i-1,N))\times K-B\ \min(i-1,N)$

Otherwise, if the minimum value B min (i−1, N) of a tooth (i−1) of the new revolution N is equal to the absolute minimum value B min(N−1) of the preceding revolution, and:

if the maximum value of the magnetic field for said tooth B max(i−1, N) has not changed since the preceding revolution (step E8), more specifically if the maximum value of the magnetic field for the tooth i−1, on the revolution N is equal to the maximum value of the magnetic field for the tooth i−1, on the revolution N−1, that is to say, if $B\ \max(i-1,N^\circ)=B\ \max(I-1,N-1)$, then, the average Avg(B max, N) of the maximum values is modified as follows (step E9):

$\text{Avg}(B\ \max,N)=\text{Avg}(B\ \max,N-1)-B\ \max(I-1,N)$

More specifically, the maximum value of the magnetic field of the tooth i−1 measured on the new revolution is removed from the average of the maximum values of the magnetic field determined on the preceding revolution.

Otherwise, if the maximum value of the magnetic field for the tooth i−1, on the revolution N, is different from the value of the magnetic field for the tooth i−1 (step E10), namely if B max(i−1,N)>B max(i−1,N−1) or if B max(i−1,N)<B max(i−1,N−1), in other words if B max(i−1,N)≠B max(i−1,N−1), then the average of the maximum values of the new revolution is not modified and remains equal to that of the preceding revolution, namely (step E10):

$\text{Avg}(B\ \max,N)=\text{Avg}(B\ \max,N-1)$

It should be noted that, if the minimum value B min(i−1,N) of the tooth i−1 is the sole value over the revolution N, which is less than the absolute minimum value B min(N−1) of the preceding revolution (N−1), then said minimum value B min(i−1,N) becomes the absolute minimum value B min(N) of the present revolution N, which will be used in the next revolution N+1.

It should also be noted that the tooth i is the tooth following the tooth i−1.

Finally, the switching threshold Th(i,N) of the next tooth i for the new revolution N is calculated according to the formula (step E11):

$$Th(i,N)=(Avg(B\ max,N)-B\ min(i-1,N))\times K-B\ min(i--1,N)$$

with k: a factor lying between 0 and 1,
Avg(B max, N): the average of the maximum values of the magnetic field over the new revolution N,
B min(i−1,N): the minimum value of the magnetic field on the preceding tooth i−1, for the new revolution N.

The method thus repeats the steps 3 to 11 for each new target revolution.

The method will now be explained by applying it to the teeth $D_1$, $D_2$, $D_3$ of FIGS. 2 and 3.

FIG. 2 illustrates the magnetic field variation induced by the passage of three teeth $D_1$, $D_2$, $D_3$ in a first tooth revolution, namely N=1.

FIG. 3 illustrates the magnetic field variation induced by the passage of three teeth $D_1$, $D_2$, $D_3$ in a second tooth revolution, namely N=2, following the first revolution.

By applying the convention of notations of the calibration method according to an aspect of the invention to FIGS. 2 and 3, with i varying from 1 to 3 and N varying from 1 to 2:

$$B\ max\ 1=B\ max(1,1)$$

$$B\ min\ 1=B\ min(1,1)$$

$$B\ max\ 2=B\ max(2,1)$$

$$B\ min\ 2=B\ min(2,1)$$

$$B\ max\ 3=B\ max(3,1)$$

$$B\ min\ 3=B\ min(3,1)$$

$$B\ max\ 1'=B\ max(1,2)$$

$$B\ min\ 1'=B\ min(1,2)$$

$$B\ max\ 2'=B\ max(2,2)$$

$$B\ min\ 2'=B\ min(2,2)$$

$$B\ max\ 3'=B\ max(3,2)$$

$$B\ min\ 3'=B\ min(3,2)$$

In FIG. 2, the minimum value of the magnetic field B min(1a) is equal to the minimum value of the magnetic field of the second tooth, namely B min(1)=B min2.

The average of the maximum values of the magnetic field, namely Avg(B max, 1), is equal to:

$$Avg(B\mathrm{max},1) = \frac{(B\mathrm{max}(1,1)+B\mathrm{max}(2,1)+B\mathrm{max}(3,1))}{3}$$

In FIG. 3, the minimum value of the magnetic field of the first tooth $D_1$ namely (i−1)=1 on the second revolution, namely N=2, is greater than the absolute minimum B min(1) of the magnetic field calculated on the preceding revolution, namely B min1'>B min(1); consequently, the switching threshold Th for the rising edge of the second tooth, i=2 on the second revolution, is equal to:

$$Th(2,2)=(B\ max(1,2)-B\ min(1,2))\times K-B\ min(1,2)$$

The minimum value of the magnetic field of the second tooth B min2' is less than the absolute minimum of the preceding revolution:

$$B\ min\ 2'<B\ min(1)$$

The maximum value of the magnetic field of the second tooth B max2' is greater than the maximum value of the magnetic field of the same tooth $D_2$ of the preceding revolution; namely:

$$B\ max\ 2'>B\ max\ 2$$

Consequently, the average of the values of the magnetic field for the second revolution is equal to:

$$Avg(B\ max,2)=Avg(B\ max,1)$$

And the switching threshold for the rising edge of the third tooth Th(3,2) is equal to:

$$Th(3,2)=(Avg(B\ max,2)-B\ min(2,2))\times K-B\ min(2,2)$$

The minimum value of the magnetic field for the third tooth B min3' of the second revolution is less than the absolute minimum value of the magnetic field of the preceding revolution, namely:

$$B\ min\ 3'<B\ min(1)$$

And the maximum value of the magnetic field of the third tooth B max3' is equal to the maximum value of the magnetic field of the same tooth of the preceding revolution:

$$B\ max\ 3'=B\ max\ 3$$

Consequently, the average of the values of the magnetic field for the third revolution is equal to:

$$Avg(B\ max,3)=Avg(B\ max,2)-B\ max(3,2)$$

and the switching threshold for the rising edge of the third tooth Th(3,2) is equal to:

$$Th(1,3)=(Avg(B\ max,3)-B\ min(3,2))\times K-B\ min(3,2)$$

An aspect of the invention is inexpensive, and easy to implement, and it makes it possible to improve the accuracy on the detection of the rising edge of the teeth, above all in the case of an "out-of-roundness".

The invention claimed is:

1. A method for automatically calibrating a camshaft sensor for a motor vehicle engine, said motor vehicle engine comprising at least one camshaft, a toothed coded target associated with this camshaft and a magnetic field sensor placed in proximity to the target to detect magnetic field variations induced by a passage of teeth ($D_1$, $D_2$, $D_3$) of the target in proximity to the sensor, said sensor delivering an electrical signal representative of teeth ($D_1$, $D_2$, $D_3$) and troughs ($S_1$, $S_2$, $S_3$) of the target as a function of a predetermined switching threshold (S) that is a function of an amplitude of the magnetic field (B), said method continuously measuring a value of the magnetic field, said method comprising:

during a first revolution of the target:
Step E1: measuring a maximum value and a minimum value of the magnetic field (B) for each tooth,
Step E2: calculating an amplitude of the magnetic field for said teeth, and calculating the switching threshold for each tooth rising edge as a function of the duly calculated amplitude,
said method further comprises:
Step E3: measuring an absolute minimum value of the magnetic field over the revolution (N−1) of the target, Step E4: calculating an average of the maximum values of the magnetic field over the revolution (N−1) of the target, Step E5: memorizing the maximum values, the absolute minimum value, and the average, then, on each new revolution (N) of the target:

Step E6: if a minimum value of a tooth (i−1) is greater than the absolute minimum value of the preceding revolution, then:

Step E7: the switching threshold of the rising edge of the next tooth (i) is set equal to $$Th(i,N)=(B\max(i-1,N)-B\min(i-1,N))\times K-B\min(i-1,N)$$

where Th(i, N) is the switching threshold of the rising edge of the next tooth (i) on each new revolution, B max (i−1,N)) is a maximum value of the magnetic field of the tooth (i−1) on each new revolution (N), and B min (i−1, N) is a minimum value of the magnetic field of the tooth (i−1) for the new revolution (N), Otherwise: if a minimum value of a tooth (i−1) is equal to the absolute minimum value of the preceding revolution (N−1), and:

Step E8: if, furthermore, the maximum value of said tooth (i−1) is equal to the maximum value of the preceding revolution for the same tooth (i−1), such that B max (i−1, N)=B max(i−1, N−1), then:

Step E9: the maximum value of said (i−1) is removed from the average of the maximum values of the new revolution, such that $$Avg(B\max,N)=Avg(B\max,N-1)-B\max(i-1,N)$$

where Avg(B max, N) is an average of the maximum values of the magnetic field over the new revolution (N), and Avg(B max, N−1) is an average of the maximum values of the magnetic field over the revolution (N−1), otherwise, if the maximum value of the tooth (i−1) is different from the maximum value of the preceding revolution for the same tooth, such that B max(i−1,N) ≠B max(i−1, N−1), then:

Step E10: the average of the maximum values for the new revolution (N) is equal to the average of the maximum values of the preceding revolution (N−1), such that: Avg(B max, N)=Avg (B max, N−1)

Step E11: the switching threshold of the rising edge for the next tooth (i) is then calculated as a function of the average of the maximum values of the new revolution (N) and of the minimum value of the preceding tooth; such that:

$$Th(i,N)=(Avg(B\max,N)-B\min(i-1,N))\times K-B\min(i-1,N)$$

with k: a factor lying between 0 and 1, repeating the steps E3 to E11 for each new revolution of the target in order to deliver a signal representative of the teeth ($D_1$, $D_2$, $D_3$) and of troughs ($S_1$, $S_2$, $S_3$) of the target.

2. The automatic calibration method as claimed in claim 1 wherein the first revolution of the target is performed each time the camshaft sensor is powered up.

3. A camshaft sensor for a motor vehicle engine, said motor vehicle engine comprising:

at least one camshaft, a toothed coded target associated with this camshaft and a magnetic field sensor placed in proximity to the target to detect magnetic field variations induced by a passage of teeth ($D_1$, $D_2$, $D_3$) of the target in proximity to the sensor, said sensor continuously measuring a value of the magnetic field and delivering an electrical signal representative of the teeth ($D_1$, $D_2$, $D_3$) and troughs ($S_1$, $S_2$, $S_3$) of the target as a function of a predetermined switching threshold (S) that is a function of an amplitude of the magnetic field (B), said camshaft sensor comprising a central processor configured to:

measure a maximum value (Bmax1, Bmax2, Bmax3) and a minimum value (Bmin1, Bmin2, Bmin3) of the magnetic field (B) on the passage of a tooth ($D_1$, $D_2$, $D_3$), calculate the amplitude of the magnetic field for each tooth and for calculating the switching threshold, measure an absolute minimum value (B min(N−1)) over the target revolution (N−1), calculate an average of the maximum values (Avg(B max, N−1)) over the target revolution (N−1), store the maximum values (Bmax1, Bmax2, Bmax3), the average of the maximum values (Avg(B max, N−1)) and the absolute minimum value (B min(N−1)) over the target revolution, compare between each minimum value (B min (i−1, N)) of the new target revolution and the absolute minimum value (B min(N−1)) of the preceding revolution, compare between each maximum value (B max(i−1,N)) of the new target revolution and the maximum value of the preceding revolution (B max(i−1)) for the same tooth (i−1), calculate the average of the maximum values Avg(B max, N) over the new target revolution as a function of the result of the comparison between each maximum value (B max(i−1, N)) of the new target revolution and the maximum value of the preceding revolution (B max(i−1)) for the same tooth (i−1), and calculate a switching threshold (Th(i, N)) as a function of the result of the comparisons.

4. A motor vehicle, comprising a camshaft sensor as claimed in claim 3.

* * * * *

UNITED STATES PATENT AND TRADEMARK OFFICE
CERTIFICATE OF CORRECTION

PATENT NO. : 10,823,588 B2
APPLICATION NO. : 16/633666
DATED : November 3, 2020
INVENTOR(S) : Denis Bouscaren It is certified that error appears in the above-identified patent and that said Letters Patent is hereby corrected as shown below:

In the Claims

In Column 11, Lines 13-14, "Th(i,N)=(B max(i-1,N)-B min(i-1,N))×K-B min(i-1,N)" should be -- Th(i,N) = (Bmax(i - 1,N) - Bmin(i - 1,N)) × K - Bmin(i-1,N) --.

In Column 11, Line 27, "B max (i-1, N)=B max(i-1, N-1)" should be -- Bmax(i - 1,N) = Bmax(i – 1,N – 1) --.

In Column 11, Line 32, "Avg(B max,N)=Avg(B max,N-1)-B max(i-1,N)" should be -- Avg(Bmax.N) = Avg (Bmax,N – 1) – Bmax(i-1,N) --.

In Column 11, Line 33, "Avg(B max, N)" should be -- Avg (Bmax, N) --.

In Column 11, Line 35, "Avg(B max, N-1)" should be -- Avg(Bmax, N-1) --.

In Column 11, Lines 40-41, "B max(i-1,N)≠B max(i-1, N-1)" should be -- Bmax(i – 1,N) ≠ Bmax(i – 1,N – 1) --.

In Column 11, Line 45, "Avg(B max, N)=Avg (B max, N-1)" should be -- Avg(Bmax, N) = Avg(Bmax,N – 1) --.

In Column 11, Line 52-53, "Th(i,N)=(Avg(B max,N)–B min(i-1,N))×K-B min(i-1,N)" should be -- Th(i,N) = (Avg(Bmax,N) – Bmin(i - 1,N)) × K – Bmin( i – 1,N) --.

In Column 12, Line 30, "(B min(N-1))" should be -- (Bmin(N-1)) --.

In Column 12, Lines 32-33, "(Avg(B max,N-1))" should be -- (Avg(Bmax, N-1)) --.

In Column 12, Line 35, "(Avg(B max, N-1))" should be -- (Avg(Bmax, N-1)) --.

Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,823,588 B2

In Column 12, Line 36, "(B min(N-1))" should be -- (Bmin(N-1)) --.

In Column 12, Line 38, "(B min (i-1, N))" should be -- (Bmin (i-1, N)) --.

In Column 12, Line 40, "(B min(N-1))" should be -- (Bmin(N-1)) --.

In Column 12, Line 41, "(B max(i-1,N))" should be -- (Bmax(i - 1,N)) --.

In Column 12, Line 43, "(B max(i-1))" should be -- (Bmax(i - 1,N - 1)) --.

In Column 12, Line 45, "Avg(B max, N)" should be -- Avg(Bmax,N) --.

In Column 12, Line 48, "(B max(i-1, N))" should be -- (Bmax(i - 1,N)) --.

In Column 12, Lines 49-50, "(B max(i-1))" should be -- (Bmax(i - 1,N - 1)) --.